United States Patent
Bott et al.

(10) Patent No.: US 9,822,720 B2
(45) Date of Patent: Nov. 21, 2017

(54) VEHICLE EXHAUST PARTICULATE FILTER REGENERATION

(71) Applicant: JAGUAR LAND ROVER LIMITED, Warwickshire (GB)

(72) Inventors: Aden Bott, Coventry (GB); Jamil Khan, Coventry (GB); Tim Slaney, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 67 days.

(21) Appl. No.: 14/767,933

(22) PCT Filed: Feb. 6, 2014

(86) PCT No.: PCT/EP2014/052357
§ 371 (c)(1),
(2) Date: Aug. 14, 2015

(87) PCT Pub. No.: WO2014/124864
PCT Pub. Date: Aug. 21, 2014

(65) Prior Publication Data
US 2015/0377160 A1 Dec. 31, 2015

(30) Foreign Application Priority Data
Feb. 15, 2013 (GB) .................. 1302632.3

(51) Int. Cl.
*F02D 41/02* (2006.01)
*F02D 37/02* (2006.01)
*F02D 41/06* (2006.01)

(52) U.S. Cl.
CPC ........... *F02D 41/029* (2013.01); *F02D 37/02* (2013.01); *F02D 41/025* (2013.01);
(Continued)

(58) Field of Classification Search
CPC .... F02B 3/00; F02B 3/04; F02D 41/00; F02D 43/00; F01N 3/023; F01N 3/10; F01M 25/06; F02M 63/02
(Continued)

(56) References Cited

U.S. PATENT DOCUMENTS 7,806,100 B2 * 10/2010 Schnorbus ............. F02D 35/02
123/299
2011/0072791 A1 * 3/2011 Bidner .................. B60K 6/485
60/278

(Continued)

FOREIGN PATENT DOCUMENTS

EP 1437497 A1 7/2004
EP 2469050 A1 6/2012

OTHER PUBLICATIONS

PCT International Search Report for International application No. PCT/EP2014/052357 dated Jun. 26, 2014.
Combined Search and Examination Report under Sections 17 and 18(3) for Application No. GB1302632.3 dated Jul. 5, 2013.

*Primary Examiner* — Duane Smith
*Assistant Examiner* — Minh-Chau Pham
(74) *Attorney, Agent, or Firm* — Carlson, Gaskey & Olds

(57) ABSTRACT

A vehicle includes an engine and a particulate filter that is situated to filter particulates from the exhaust fluid. A controller is configured to implement a sequence of particulate filter regeneration techniques including a first technique during an engine cold start condition, a second technique during a running engine idle condition, and a third technique during a driving condition. The controller is configured to determine whether particulate filter regeneration is desired, implement the first technique when particulate filter regeneration is desired, determine whether particulate filter regeneration is still desired after using the first technique, implement the second technique when regeneration is still desired after using the first technique, determine whether particulate
(Continued)

filter regeneration is still desired after using the second technique, and implement the third technique when regeneration is still desired after using the second technique.

17 Claims, 3 Drawing Sheets

(52) U.S. Cl.
CPC ...... *F02D 41/0245* (2013.01); *F01N 2900/16* (2013.01); *F02D 41/06* (2013.01); *F02D 41/064* (2013.01); *Y02T 10/26* (2013.01)

(58) Field of Classification Search
USPC .......... 55/385.3, DIG. 30; 60/706, 285, 295, 60/299, 287, 278, 274, 286; 123/406.19, 123/406.23, 406.44, 406.55, 406.46, 123/406.5, 672, 675, 676, 299, 300, 304, 123/295, 430, 301, 435
See application file for complete search history.

(56) References Cited

U.S. PATENT DOCUMENTS

| | | |
|---|---|---|
| 2011/0072793 A1 | 3/2011 | Bidner et al. |
| 2011/0073070 A1 | 3/2011 | Ruhland et al. |
| 2011/0073088 A1* | 3/2011 | Hubbard ................. F01N 3/021 123/703 |
| 2011/0100013 A1* | 5/2011 | Whitney ............. F02D 41/0005 60/706 |
| 2014/0069380 A1* | 3/2014 | Leone ................... F02M 26/01 123/406.12 |

\* cited by examiner

VEHICLE EXHAUST PARTICULATE FILTER REGENERATION

TECHNICAL FIELD

The subject matter of this application generally relates to managing vehicle exhaust filter operation. More particularly, but not exclusively, the subject matter of this application relates to regenerating an exhaust particulate filter. Aspects of the subject matter of this description relate to a vehicle, to a method and to a system.

BACKGROUND

Many modern vehicles are provided with components designed to manage vehicle emissions into the atmosphere. For example, some vehicles include particulate filters associated with the vehicle exhaust system for filtering exhaust fluid produced by the engine. A variety of such filters are known.

One issue presented by some exhaust particulate filters is that they may lose filtering capability or become ineffective if the filter is not regenerated. It is possible, for example, for the filter to become plugged if accumulated soot is not purged from the filter. In many cases filter regeneration occurs passively as the heat of the vehicle exhaust is sufficient for filter regeneration during the normal course of vehicle operation. In some cases, however, the vehicle is used in a manner that the vehicle exhaust does not become hot enough for a sufficiently long time to achieve filter regeneration. Proposals have been made for addressing such a situation.

One proposal is shown in U.S. Pat. No. 8,136,505. That proposal is to retard the spark angle at which spark is delivered to a cylinder of the vehicle engine to increase the temperature of the exhaust and the particulate filter. Even if such a spark control is used, however, it is possible that it will not have the desired effect. Additional measures may be needed to ensure that temperatures sufficient for regeneration are reached for a sufficient time. Additionally, new governmental regulations are being imposed that place new restrictions on vehicle emissions and previously proposed approaches may not satisfy such new standards.

SUMMARY

According to an embodiment, a vehicle includes an engine and a plurality of spark plugs associated with the engine. An exhaust carries exhaust fluid away from the engine. A particulate filter is situated to filter particulates from the exhaust fluid. A controller is configured to implement a sequence of particulate filter regeneration techniques including a first technique during an engine start up condition, a second technique during a running engine idle condition, and a third technique during a driving condition. The controller is configured to determine whether particulate filter regeneration is desired, implement the first technique when particulate filter regeneration is desired, determine whether particulate filter regeneration is still desired after using the first technique, implement the second technique when regeneration is still desired, determine whether particulate filter regeneration is still desired after using the second technique, and implement the third technique when regeneration is still desired after using the second technique.

In an embodiment including one or more features of the vehicle of the preceding paragraph at least one of the particulate filter regeneration techniques comprises altering a timing of operation of at least one of the sparkplugs.

In an embodiment including one or more features of the vehicle of any of the preceding paragraphs each of the particulate filter regeneration techniques comprises altering a timing of operation of the at least one of the sparkplugs.

In an embodiment including one or more features of the vehicle of any of the preceding paragraphs the at least one of the particulate filter regeneration techniques comprises introducing additional oxygen into the exhaust fluid.

In an embodiment including one or more features of the vehicle of any of the preceding paragraphs introducing additional oxygen into the exhaust fluid comprises operating the engine at a lean air-to-fuel ratio.

In an embodiment including one or more features of the vehicle of any of the preceding paragraphs the at least one regeneration technique is the first technique; and the first technique comprises pulsing between a lean air-to-fuel ratio and a rich air-to-fuel ratio.

In an embodiment including one or more features of the vehicle of any of the preceding paragraphs the first technique includes extending a duration of a cold start idle speed of the engine; the second technique includes increasing an idle speed of the engine while the vehicle is stationary; and the third technique includes determining that a driving speed of the engine is below a predetermined threshold.

According to an embodiment, a method of regenerating a particulate filter associated with an exhaust of a vehicle includes using a controller configured to implement a sequence of particulate filter regeneration techniques including a first technique during an engine start up condition, a second technique during a running engine idle condition, and a third technique during a driving condition. A determination is made whether particulate filter regeneration is desired. The first technique is implemented when particulate filter regeneration is desired. A determination is made whether particulate filter regeneration is still desired after using the first technique. The second technique is implemented if regeneration is still desired. A determination is made whether particulate filter regeneration is still desired after using the second technique. The third technique is implemented when regeneration is still desired after using the second technique.

In an embodiment including one or more features of the method of the preceding paragraph at least one of the particulate filter regeneration techniques comprises altering a timing of operation of at least one sparkplug.

In an embodiment including one or more features of the vehicle of any of the preceding paragraphs each of the particulate filter regeneration techniques comprises altering a timing of operation of the at least one sparkplug.

In an embodiment including one or more features of the vehicle of any of the preceding paragraphs the at least one of the particulate filter regeneration techniques comprises introducing additional oxygen into exhaust fluid prior to the exhaust fluid reaching the particulate filter.

In an embodiment including one or more features of the vehicle of any of the preceding paragraphs introducing additional oxygen into the exhaust fluid comprises operating the engine at a lean air-to-fuel ratio.

In an embodiment including one or more features of the vehicle of any of the preceding paragraphs the at least one regeneration technique is the first technique; and the first technique comprises pulsing between a lean air-to-fuel ratio and a rich air-to-fuel ratio.

In an embodiment including one or more features of the vehicle of any of the preceding paragraphs the first technique includes extending a duration of a cold start idle speed of the engine; the second technique includes increasing an idle speed of the engine while the vehicle is stationary; and the third technique includes determining that a driving speed of the engine is below a predetermined threshold.

According to an embodiment, a particulate filter regeneration system includes a particulate filter, which is configured to be associated with a vehicle exhaust for filtering at least one particulate from an engine exhaust fluid, and a controller, which is configured to implement a sequence of particulate filter regeneration techniques including a first technique during an engine start up condition, a second technique during a running engine idle condition, and a third technique during a driving condition. The controller is configured to determine whether particulate filter regeneration is desired, implement the first technique if particulate filter regeneration is desired, determine whether particulate filter regeneration is still desired after using the first technique, implement the second technique if regeneration is still desired, determine whether particulate filter regeneration is still desired after using the second technique, and implement the third technique if regeneration is still desired after using the second technique.

In an embodiment including one or more features of the system of the preceding paragraph at least one of the particulate filter regeneration techniques comprises altering a timing of operation of at least one sparkplug associated with an engine that produces the exhaust fluid.

In an embodiment including one or more features of the system of any of the preceding paragraphs each of the particulate filter regeneration techniques comprises altering a timing of operation of the at least one sparkplug.

In an embodiment including one or more features of the system of any of the preceding paragraphs the at least one of the particulate filter regeneration techniques comprises introducing additional oxygen into the exhaust fluid.

In an embodiment including one or more features of the system of any of the preceding paragraphs the at least one regeneration technique is the first technique; and the first technique comprises pulsing between a lean air-to-fuel ratio and a rich air-to-fuel ratio.

In an embodiment including one or more features of the system of any of the preceding paragraphs the first technique includes extending a duration of a cold start idle speed of the engine; the second technique includes increasing an idle speed of the engine while the vehicle is stationary; and the third technique includes determining that a driving speed of the engine is below a predetermined threshold.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

One or more embodiments of the present invention will now be described, by way of example only, with reference to the accompanying drawings, which can be briefly described as follows.

DETAILED DESCRIPTION

Figure 1:
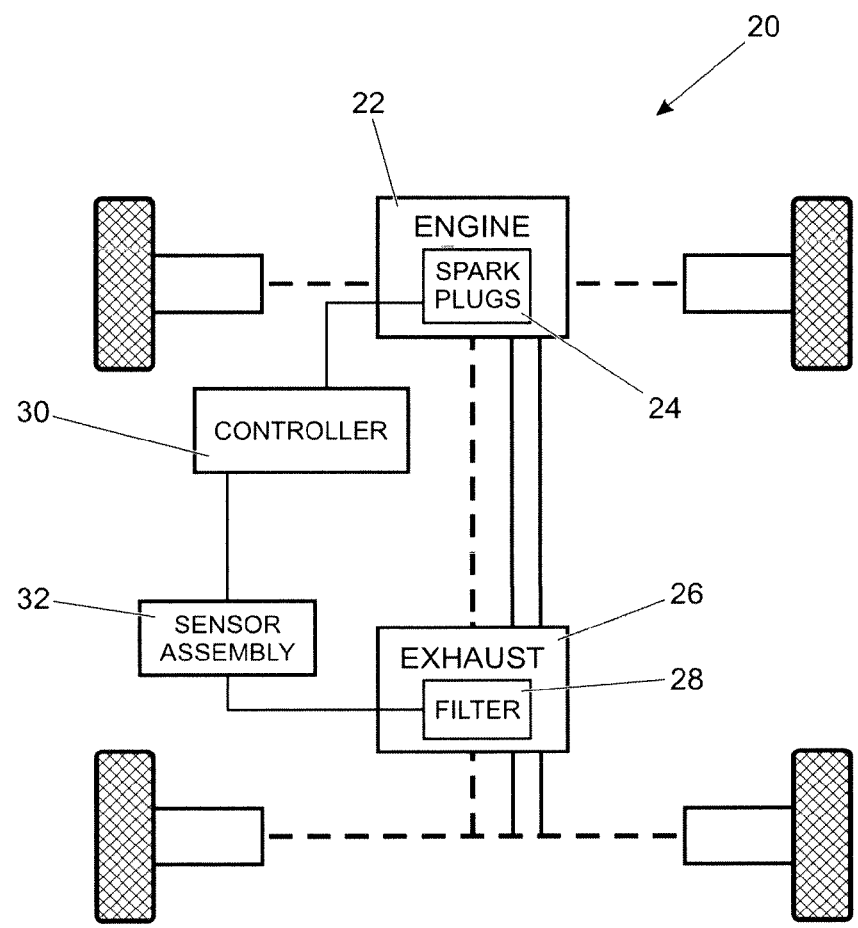
FIG. 1 diagrammatically illustrates selected portions of a vehicle designed according to an embodiment of this invention that includes a system for regenerating a particulate filter.

FIG. 1 schematically illustrates selected portions of a vehicle 20, such as a passenger vehicle. An engine 22 has a plurality of spark plugs 24 associated with the engine 22 in a known manner. An exhaust 26 carries engine exhaust fluid (e.g., gases) away from the engine 22. A particulate filter 28 is situated to filter particulates from the exhaust fluid before it exits the exhaust 26. The example particulate filter 28 works in a generally known manner.

A controller 30 monitors a condition of the particulate filter 28 to determine whether there is a need for filter regeneration. In the illustrated example, the controller 30 obtains information from a sensor assembly 32 regarding a plurality of parameters, such as a temperature of the exhaust fluid, a temperature of the particulate filter 28, a fluid pressure associated with the particulate filter 28 or the exhaust 26 and an amount or concentration of oxygen within the exhaust fluid. The sensor assembly 32 may include one or more sensors that obtain such information in a known manner. Although schematically shown separately for discussion purposes, the sensor assembly 32 may include one or more sensors or sensor capabilities that are within the controller 30 or the particulate filter 28, for example.

Figure 2:
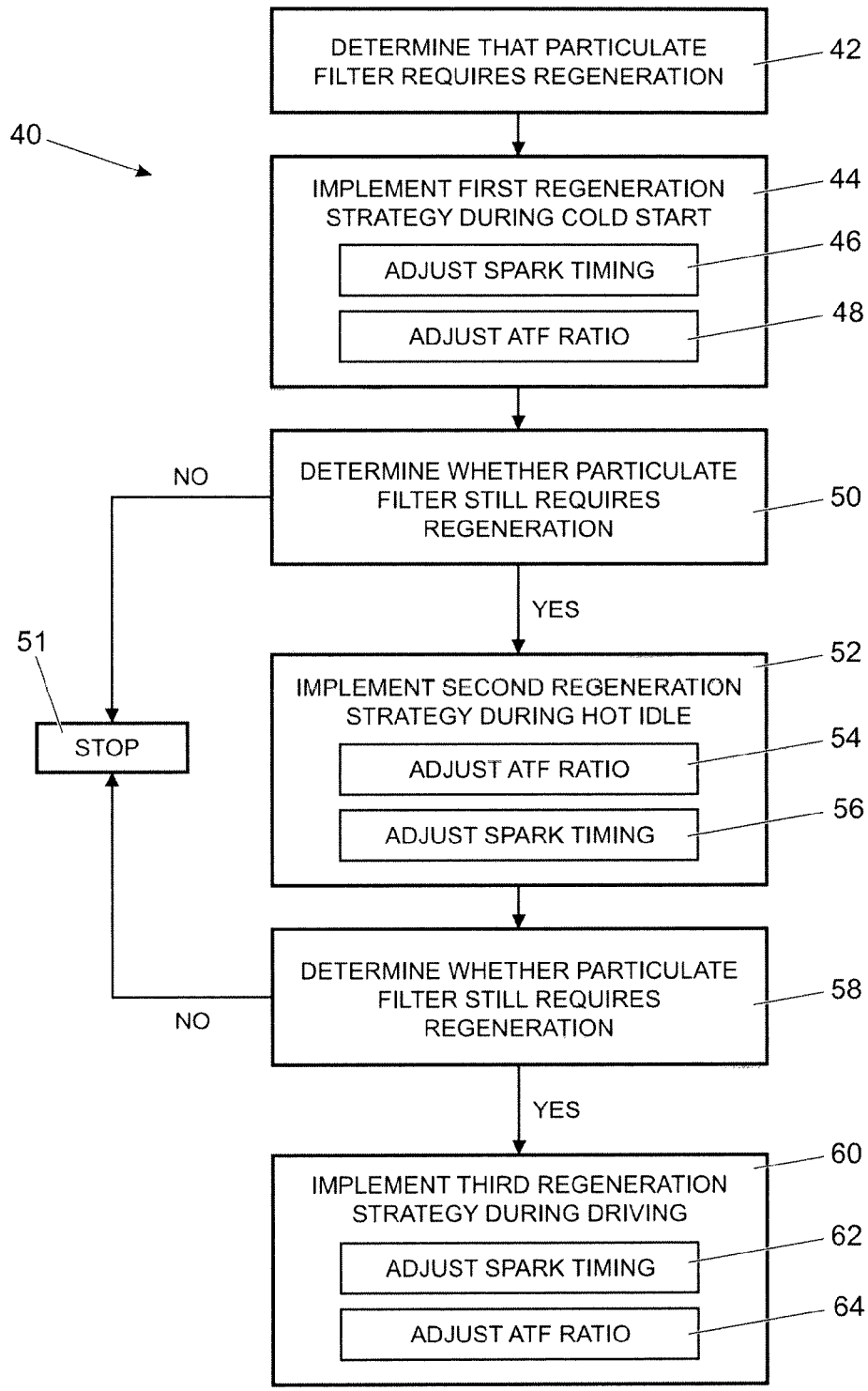
FIG. 2 is a flowchart diagram summarizing an example sequence of filter regeneration techniques designed according to an embodiment of this invention.

The controller 30 is configured to use a sequence of regeneration techniques for achieving regeneration of the particulate filter 28 when needed or desired. FIG. 2 is a flowchart diagram 40 summarizing an example implementation of a sequence of filter regeneration techniques. At 42, the controller 30 determines that particulate filter regeneration is desired. The determination made at 42 may be based on an indication that a reduced amount of exhaust fluid is passing through the filter 28 or a detected amount of backpressure near the engine 22. Another possible indicator that filter regeneration is desired or needed may be a determination that the particulate filter 28 has not been exposed to a temperature sufficiently high to facilitate filter regeneration over a time or a distance of vehicle travel that exceeds an appropriate threshold. Those skilled in the art who have the benefit of this description will realize what basis or bases to use for determining when filter regeneration is desired.

If filter regeneration is desired, then the controller 30 implements a first regeneration technique at 44. The first regeneration technique is implemented during a cold start, which corresponds to a condition in which the engine 22 was off and has just been started. One embodiment includes the controller 30 extending an amount of time that the engine 22 operates in a cold start mode. For example, the controller 30 controls an idle speed of the engine 22 to maintain a relatively higher idle speed for a longer time than otherwise would be used during a cold start of the engine 22. Extending the cold start operation introduces the possibility of generating additional heat that contributes to filter regeneration.

As indicated at 46, the first technique includes the controller 30 adjusting a timing of at least one of the spark plugs 24 to alter the manner in which at least one cylinder of the engine 22 operates to introduce additional heat into the exhaust fluid from the engine 22. This additional heat contributes to exposing the particulate filter 28 to a temperature that may be sufficiently high to facilitate filter regeneration. The example of FIG. 2 also includes adjusting an air-to-fuel (ATF) ratio at 48. There are known ways of adjusting the ATF between a lean or rich ratio. Adjusting the ATF to a lean ratio (e.g., $\lambda > 1$) introduces additional oxygen into the exhaust, which facilitates soot combustion and filter regeneration. In some embodiments, the ATF is controlled to pulse between a rich and a lean mixture during the first filter regeneration technique.

After the cold start sequence is over, the controller 30 stops using the first filter regeneration technique and makes a determination at 50 whether filter regeneration is still needed. Depending on the condition of the filter prior to implementing the first technique, it may be possible for the particulate filter 28 to be sufficiently regenerated after the first technique is complete. If so, the controller 30 stops the regeneration process as shown at 51. In many situations, the first technique alone will not result in a sufficiently regenerated particulate filter 28. If filter regeneration is still desired, the controller 30 continues through its sequence of techniques and implements a second technique at 52.

The controller implements the second technique during a hot idle condition, which occurs when the engine 22 is running but the vehicle 20 is stationary. During such conditions, the second technique capitalizes on reserve torque available from the engine 22 for generating additional heat so that the particulate filter 28 is exposed to hotter exhaust fluid to further facilitate filter regeneration. The second technique implemented at 52 includes adjusting spark timing at 54. An example adjustment includes delaying the spark of at least one of the spark plugs 24 to introduce additional heat into the exhaust fluid. At 56, the controller 30 adjusts the ATF ratio to further facilitate soot combustion and filter regeneration.

The controller will stop the second technique, for example, when the vehicle 20 begins to move and the speed of the engine 22 transitions from an idle speed to a driving engine speed. At 58, the controller 30 determines whether filter regeneration is still desired after the second technique was implemented. In situations where no further regeneration is needed, the controller will stop the sequence of regeneration techniques at 51 and subsequently begin a next regeneration cycle when desired by implementing the first technique at 44 as described above.

Assuming that the filter still requires regeneration after performing the second technique at 52, the controller 30 implements a third filter regeneration technique at 60 during a driving condition that meets preselected criteria. For example, if the vehicle speed is sufficiently low (e.g., below a predetermined threshold speed) or the load on the engine 22 is sufficiently low, the reserve torque that is available allows for implementing the third filter regeneration technique in a manner that is likely not noticeable to the driver. The third technique in this example includes adjusting the timing of at least one spark plug at 62 and adjusting the ATF at 64.

In at least some situations, one cycle through the sequence of regeneration techniques will provide a desired amount of filter regeneration. In the event that additional filter regeneration is still desired after implementing all three of the example techniques, the controller 30 will attempt to restart the sequence during a subsequent cold start of the engine.

Figure 3:
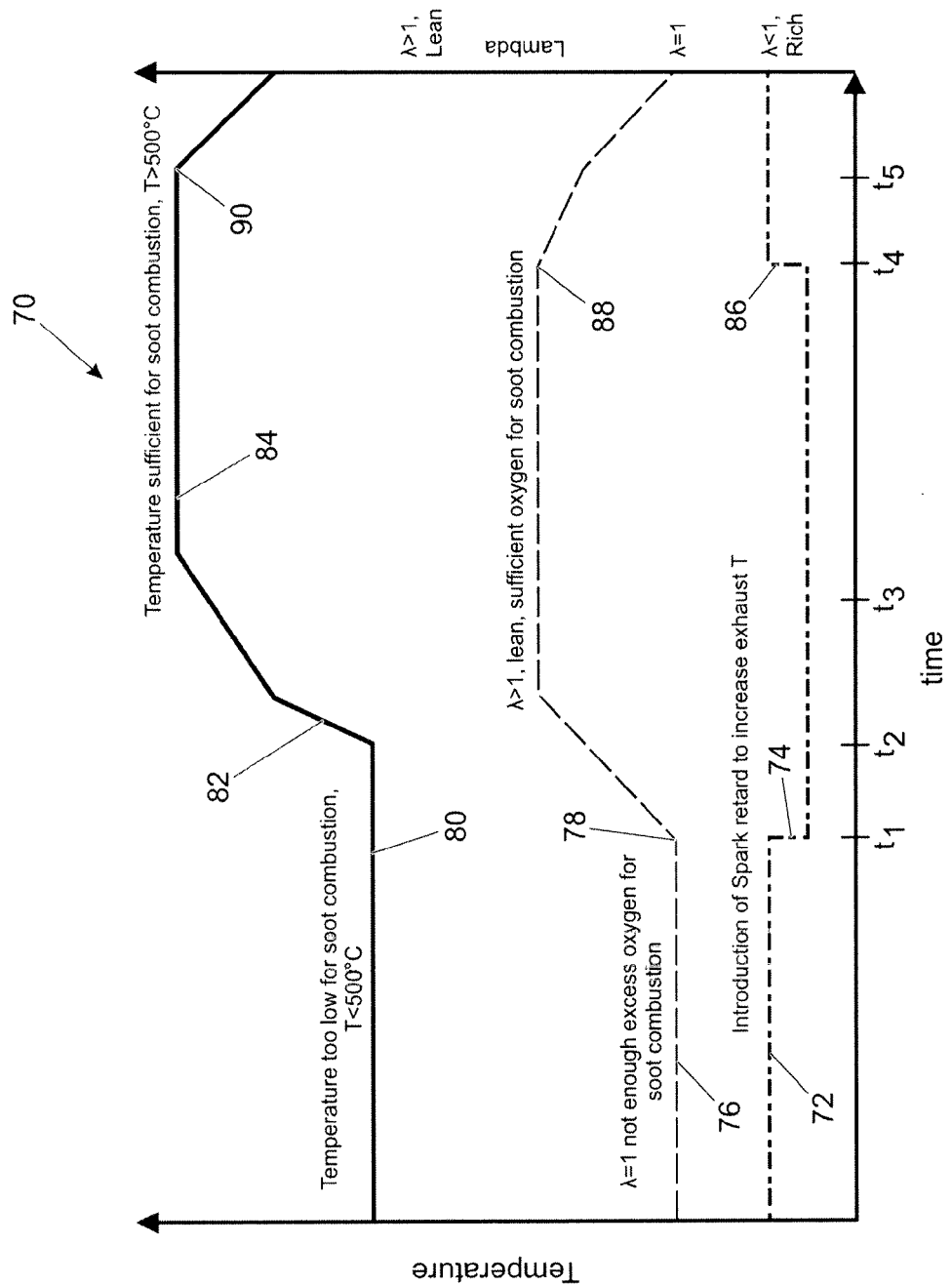
FIG. 3 graphically illustrates a feature of the techniques included in an embodiment of this invention.

FIG. 3 graphically illustrates an effect of adjusting the timing of at least one spark plug 24 during implementation of any of the example filter regeneration techniques. The plot 70 includes an indication of spark angle of a representative spark plug 24 at 72. At a time t1, the spark angle is adjusted as shown at 74. At the same time the ATF, which is represented by the line 76 showing a value of $\lambda$, is adjusted as shown at 78. At a time t2 the temperature of the filter shown at 80 begins to increase as shown at 82 because of the increased temperature introduced by the cylinder operation associated with the reduced spark angle. At a time t3 the temperature reaches a level at 84 that is sufficiently high to facilitate soot combustion and filter regeneration. In one example, the temperature at 84 corresponds to at least approximately 500 degrees C.

The controller 30 increases the spark angle as shown at 86 at a time t4. At the same time, the controller 30 begins transitioning the ATF back down to a $\lambda$ value of 1. The elevated temperature at 84 continues until a time t5 and begins to drop as shown at 90.

The illustrated example controller 30 is configured to use a sequence of three filter regeneration techniques in the order that they are described (i.e., the first technique is implemented before the second technique, which precedes the third technique). Other embodiments may include more techniques or a different order of the example techniques. Using a sequence of techniques in a predetermined order better facilitates particulate filter regeneration, in part, because it increases the time during which filter regeneration is attempted during a use of the vehicle 20. Additionally, the varied circumstances during which the different techniques are implemented contribute to more effective filter regeneration.

While various features and aspects are described above in connection with one or more particular embodiments, those features and aspects are not necessarily exclusive to the corresponding embodiment. The disclosed features and aspects may be combined in other ways than those specifically mentioned above. In other words, any feature of one embodiment may be included with or substituted for a feature of another embodiment.

The preceding description is illustrative rather than limiting in nature. Variations and modifications to the disclosed examples may become apparent to those skilled in the art that do not necessarily depart from the essence of the contribution to the art provided by the disclosed examples. The scope of legal protection provided to the invention can only be determined by studying the following claims in which it is intended that each dependent claim can be combined with any other dependent or independent claim either alone or in combination.

The invention claimed is:

1. A vehicle, comprising:
an engine;
a plurality of sparkplugs associated with the engine;
an exhaust that carries exhaust fluid away from the engine;
a particulate filter that is situated to filter particulates from the exhaust fluid; and
a controller configured to implement a sequence of particulate filter regeneration techniques, at least one of the particulate filter regeneration techniques comprising altering a timing of operation of at least one of the sparkplugs or varying an amount of oxygen in the exhaust fluid, the sequence of particulate filter regeneration techniques including a first particulate filter regeneration technique during an engine cold start condition, a second particulate filter regeneration technique during a running engine idle condition, and a third particulate filter regeneration technique during a driving condition, the controller being configured to:

determine, before or during the engine cold start condition, whether particulate filter regeneration is desired;

implement the first particulate filter regeneration technique when particulate filter regeneration is desired;

determine, during the running engine idle condition, whether particulate filter regeneration is still desired after using the first particulate filter regeneration technique;

implement the second particulate filter regeneration technique when regeneration is still desired after using the first particulate filter regeneration technique;

determine, during the driving condition, whether particulate filter regeneration is still desired after using the second particulate filter regeneration technique; and implement the third particulate filter regeneration technique when regeneration is still desired after using the second particulate filter regeneration technique.

2. The vehicle of claim 1, wherein each of the particulate filter regeneration techniques comprises altering a timing of operation of the at least one of the sparkplugs.

3. The vehicle of claim 1, wherein the at least one of the particulate filter regeneration techniques comprises introducing additional oxygen into the exhaust fluid.

4. The vehicle of claim 3, wherein introducing additional oxygen into the exhaust fluid comprises operating the engine at a lean air-to-fuel ratio.

5. The vehicle of claim 1, wherein the first particulate filter regeneration technique comprises altering the timing of operation of the at least one of the sparkplugs and pulsing between a lean air-to-fuel ratio and a rich air-to-fuel ratio.

6. The vehicle of claim 1, wherein:
the first particulate filter regeneration technique includes extending a duration of a cold start idle speed of the engine;
the second particulate filter regeneration technique includes increasing an idle speed of the engine while the vehicle is stationary; and
the third particulate filter regeneration technique includes determining that a driving speed of the vehicle is below a predetermined threshold.

7. A method of regenerating a particulate filter associated with an exhaust of a vehicle, comprising the steps of:
using a controller configured to implement a sequence of particulate filter regeneration techniques, at least one of the particulate filter regeneration techniques comprising altering a timing of operation of at least one of the sparkplugs or varying an amount of oxygen in the exhaust fluid, the sequence of particulate filter regeneration techniques including a first particulate filter regeneration technique during an engine cold start condition, a second particulate filter regeneration technique during a running engine idle condition, and a third particulate filter regeneration technique during a driving condition;
determining, before or during an engine cold start condition, whether particulate filter regeneration is desired;
implementing the first particulate filter regeneration technique when particulate filter regeneration is desired;
determining, during a running engine idle condition, whether particulate filter regeneration is still desired after using the first particulate filter regeneration technique;
implementing the second particulate filter regeneration technique when regeneration is still desired after using the first particulate filter regeneration technique;
determining, during a driving condition, whether particulate filter regeneration is still desired after using the second particulate filter regeneration technique; and
implementing the third particulate filter regeneration technique when regeneration is still desired after using the second particulate filter regeneration technique.

8. The method of claim 7, wherein each of the particulate filter regeneration techniques comprises altering a timing of operation of the at least one sparkplug.

9. The method of claim 7, wherein the at least one of the particulate filter regeneration techniques comprises introducing additional oxygen into exhaust fluid prior to the exhaust fluid reaching the particulate filter.

10. The method of claim 9, wherein introducing additional oxygen into the exhaust fluid comprises operating the engine at a lean air-to-fuel ratio.

11. The method of claim 7 wherein the first particulate filter regeneration technique comprises altering the timing of operation of the at least one of the sparkplugs and pulsing between a lean air-to-fuel ratio and a rich air-to-fuel ratio.

12. The method of claim 7, wherein:
the first particulate filter regeneration technique includes extending a duration of a cold start idle speed of the engine;
the second particulate filter regeneration technique includes increasing an idle speed of the engine while the vehicle is stationary; and
the third particulate filter regeneration technique includes determining that a driving speed of the vehicle is below a predetermined threshold.

13. A particulate filter regeneration system, comprising:
a particulate filter configured to be associated with a vehicle exhaust for filtering at least one particulate from an engine exhaust fluid; and
a controller configured to implement a sequence of particulate filter regeneration techniques, at least one of the particulate filter regeneration techniques comprising altering a timing of operation of at least one of the sparkplugs or varying an amount of oxygen in the exhaust fluid, the sequence of particulate filter regeneration techniques including a first particulate filter regeneration technique during an engine cold start condition, a second particulate filter regeneration technique during a running engine idle condition, and a third particulate filter regeneration technique during a driving condition, the controller being configured to:
determine, before or during an engine cold start condition, whether particulate filter regeneration is desired;
implement the first particulate filter regeneration technique when particulate filter regeneration is desired;
determine, during a running engine idle condition, whether particulate filter regeneration is still desired after using the first particulate filter regeneration technique;
implement the second particulate filter regeneration technique when regeneration is still desired after using the first particulate filter regeneration technique;
determine, during a driving condition, whether particulate filter regeneration is still desired after using the second particulate filter regeneration technique; and
implement the third particulate filter regeneration technique when regeneration is still desired after using the second particulate filter regeneration technique.

14. The particulate filter regeneration system of claim 13, wherein each of the particulate filter regeneration techniques comprises altering a timing of operation of the at least one sparkplug.

15. The particulate filter regeneration system of claim 13, wherein the at least one of the particulate filter regeneration techniques comprises introducing additional oxygen into the exhaust fluid.

16. The particulate filter regeneration system of claim 13, wherein the first particulate filter regeneration technique comprises altering the timing of operation of the at least one of the sparkplugs and pulsing between a lean air-to-fuel ratio and a rich air-to-fuel ratio.

17. The particulate filter regeneration system of claim 13, wherein:
- the first particulate filter regeneration technique includes extending a duration of a cold start idle speed of the engine;
- the second particulate filter regeneration technique includes increasing an idle speed of the engine while the vehicle is stationary; and
- the third particulate filter regeneration technique includes determining that a driving speed of the vehicle is below a predetermined threshold.

* * * * *